United States Patent [19]

Kitchens

[11] Patent Number: 4,551,939
[45] Date of Patent: Nov. 12, 1985

[54] BASS FISHING ORGANIZER

[76] Inventor: Doyle W. Kitchens, 120 Meandering Way, Del Rio, Tex. 78840

[21] Appl. No.: 534,969

[22] Filed: Sep. 22, 1983

[51] Int. Cl.$^4$ .............................................. A01K 97/10
[52] U.S. Cl. ..................................... 43/21.2; 248/513; 248/518; 248/520
[58] Field of Search ............................. 43/21.2, 15, 17; 403/326, 324, 378; 248/538, 520, 126, 512, 513, 518, 519, 535, 523, 511, 536, 539; D22/13, 22

[56] References Cited

U.S. PATENT DOCUMENTS

| | | | |
|---|---|---|---|
| D. 179,525 | 1/1957 | Porter | 43/21.2 |
| 2,110,397 | 3/1938 | Kangas | 403/326 |
| 2,249,302 | 7/1941 | Smith | 43/21.2 |
| 2,704,412 | 3/1955 | Davis | 248/518 |
| 3,385,544 | 5/1968 | Barnett | 248/513 |
| 3,570,793 | 3/1971 | Shackel | 43/21.2 |
| 3,964,706 | 6/1976 | Adams | 43/21.2 |
| 4,109,796 | 8/1978 | Mitchell | 43/21.2 |
| 4,157,804 | 6/1979 | Byford | 248/539 |

Primary Examiner—Gene P. Crosby
Attorney, Agent, or Firm—Wofford, Fails & Zobal

[57] ABSTRACT

A bass fishing organizer for holding in place a plurality of ordered fishing rods and respective associated accessories comprising at least one mounting based for being affixed to the deck of a boat and holding by way of a central support a bank member that, in turn, holds a plurality of respective holders for the respective fishing rods and accessories. Preferably a secondary mounting base is provided for storing the entire bank member with the holders and fishing rods such that they can be removed from a storage place such as a garage and emplaced on a boat easily. For example, the bank member may have as its central support a shaft that coengages a throat of a mounting base with slots in the throat and a C-clamp that snaps releaseably in place to engage a groove on the central support member shaft to enable pivotal mounting of the rods for convenience of the fisherman in getting to the respective rod and bait that he desires.

7 Claims, 4 Drawing Figures

BASS FISHING ORGANIZER

FIELD OF THE INVENTION

This invention relates to bass fishing organizers for holding a plurality of ordered fishing rods and respective accessories. More specifically, this invention relates to a positioning rack for simultaneously supporting a plurality of profiled, priorly assembled as desired, reel type fishing rods with accessories such as baits and the like, to afford the bass fisherman maximum time fishing with the desired type of bait and without required re-rigging of the fishing rods.

DESCRIPTION OF THE PRIOR ART

It has been known to use various types of holding devices for holding fishing rods to relieve fisherman of the task of having to hold the rods at all times. Generally such holders have been of simple construction and clamped to the side of the boat or the like, or to the railing of a pier. Such holders may have been normally intended to support the rod in active fishing position to avoid the necessity of the fisherman constantly holding the rod; or to support it, with or without alarms, such that the line does not become entangled in another line on the boat or with a portion of the boat. Additional types of supports have been those collapsible supports for holding a fishing rod in place on a beach or the like.

Typical of the prior art turned up by a pre-examination search are those types of apparatus described in the following U.S. patents. U.S. Pat. No. 3,074,674 discloses a support and holder device for fishing rod and employing a compression spring for biasing it toward the top of a pole that can be stuck in the ground or the like. U.S. Pat. No. 3,546,805 discloses portable fishing pole holder and alarm, with light, that can be carried to and assembled at a site. Audible and visual alarms are provided in this apparatus. U.S. Pat. No. 3,667,708 describes, illustrates and claims combination fishing rod and flashlight holder attachments for cylindrical objects such as minnow buckets and the like. U.S. Pat. No. 3,603,019 describes a combination fishing bucket having tubular members for holding fishing rods for fishing. U.S. Pat. No. 3,701,504 discloses a collapsible fishing pole rack that can be erected at the site and yet readily removed from the rack by the fisherman for playing a fish. U.S. Pat. No. 3,964,706 discloses a holder assembly for fishing rods and fishing accessories in which the fishing rods are held vertical during cruising to and from the fishing grounds or for trolling. This apparatus employs vertically oriented sleeves that can be inserted in a socket and twisted into place and has a base that can be slid to emplace it adjacent and behind heads of screws or the like. The vertical orientation of the sleeves prevents damaging the fishing rods, nets or the like during transport. U.S. Pat. No. 4,157,803 shows a fishing rod holder that comprises a body that extends from gunwale to gunwale of the boat and has legs for affixing to the gunwales; and including tubular supports that can be angled as desired for holding the rod for trolling during fishing.

From the foregoing, it can be seen that the prior art has been primarily concerned with holding the fishing rods during actual fishing operation or holding them in a vertical position during the ride to the fishing grounds. The prior art has not provided an economical, easily employable bank of pre-organized, pre-fitted fishing rods held in an organized position to be readily selected by a bass fisherman or the like. More specifically, the prior art has not provided a holder that can be pivotally mounted on a mounting base and that can hold organized fishing rods adjacent a bass fisherman on the deck of a boat, or hold them in storage.

SUMMARY OF THE INVENTION

Accordingly, it is an object of this invention to provide an economical, easily employable bank of pre-organized pre-fitted fishing rods held in an organized position to be readily selected by bass fisherman or the like.

It is a specific object of this invention to provide a holder that can be pivotally mounted on a mounting base and can hold organized fishing rods adjacent to bass fishermen on the deck of a boat, adjacent a seat, or hold them in storage in a garage or the like.

These and other objects will become apparent from the descriptive matter hereinafter, particularly when taken in conjunction with the appended drawings.

In accordance with this invention there is provided a bass fishing organizer for holding a plurality of ordered fishing rods and respective associated accessories comprising:

at least one mounting base for being affixed to a surface and adapted for holding a plurality of fishing rods and accessories;

a bank member having sufficient length and strength to hold in place the plurality of rods and accessories and holders therefor; the bank member having a central support adjacent its center and adapted to be connected with the base;

the central support and the mounting base having coengaging means for supporting the fishing rods and accessories; and respective holders for the fishing rods and accessories; the holders comprising one each for each fishing rod and being connected with the bank member. Each holder has a tubular member adapted to receive a respective handle of a respective fishing rod and to hold it releasably in place.

Preferably there are provided two mounting bases, one on the deck of the boat and one in the storage area, such as a garage.

In specific preferred embodiments, the mounting bases have throats that are adapted to receive, releasably and pivotally, a shaft of the central support and the shaft is retained in place by engagement of a C-clamp with a groove in the shaft, the C-clamp being inserted through slots in the throats thereabout. Preferably, the bank member is angled with respect to the central support and the central support engages the base at substantially 90° so as to hold the fishing rods in the correct position most advantageous to the fisherman that he may be able to cast without interference from rods in the organizer, or for lifting the rod and immediately starting use.

DESCRIPTION OF PREFERRED EMBODIMENT(S)

Figure 1:
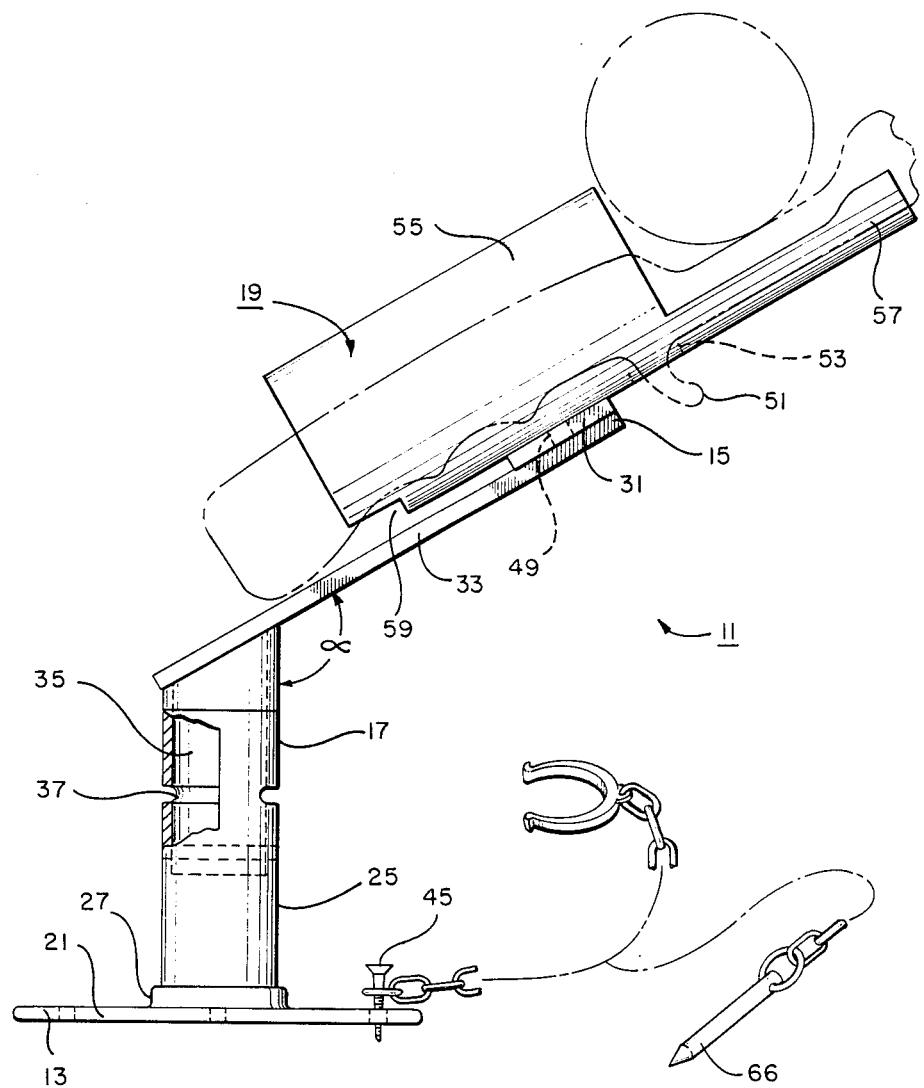
FIG. 1 is a side elevational view of one embodiment of this invention.
Figure 2:
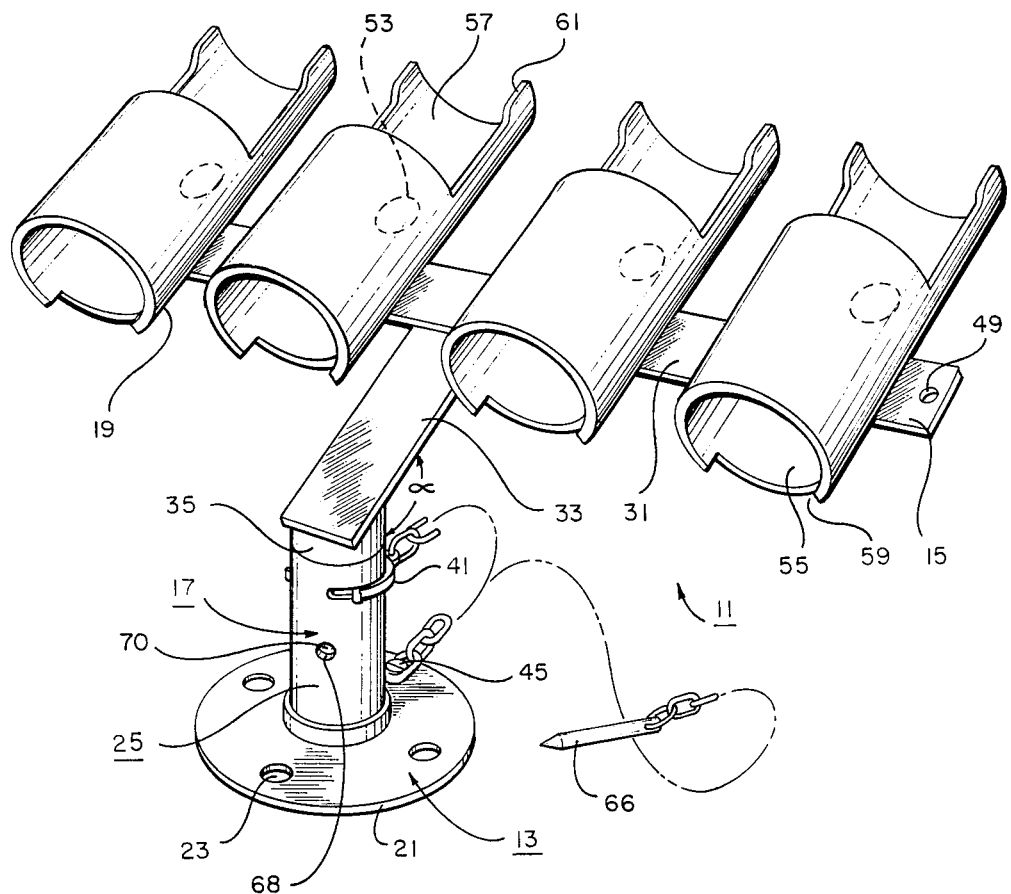
FIG. 2 is a perspective view of one embodiment of this invention.

Referring to FIGS. 1 and 2, the bass organizer 11 is designed to hold a plurality of ordered fishing rods and their respective associated accessories, such as line, lure and the like. The bass fishing organizer 11 comprises at least one mounting base 13, a bank member 15, a central support 17 and a plurality of respective holders 19 for the fishing rods and accessories.

The mounting base 13 is adapted for being affixed to a surface and for holding the plurality of fishing rods and accessories. Any of the conventional type bases can be employed in this invention. Preferably, the base 13 has a substantially planar portion 21 that has a means, such as apertures 23, for being attached to a surface such as the deck of a boat or a storage place like a wall of a garage. The means, such as the apertures 23, allow a plurality of fasteners, such as nails, bolts, screws and the like, to hold the base firmly affixed to the surface. The planar portion 21 may be formed of any material having adequate structural strength to hold the remainder of the organizer 11 and fishing rods inserted thereinto. Preferably, it would be formed of a metal that resists corrosion. Typical of such metals are brass or other alloys of copper, chromium-plated steel or the like, or even polished aluminum. Other metals such as magnesium, tantalum and the like could be employed, of courese but are, ordinarily, more expensive than necessary. Even plastics would probably have adequate structural strength, given the proper design. One of the problems of plastics is the tendency to cold flow, however. The planar portion 21 must have adequate structural strength to hold an upstanding portion 25. The upstanding portion 25 is disposed substantially 90° with respect to the planar portion 21. Ordinarily, it is advantageous to cast the base and the upstanding portion as a unitary member. As illustrated, the planar portion 21 may have a short collar 27 affixed as by welding, and threadedly receive the upstanding portion 25 for adequate structural strength. In fact, in the illustrated embodiment, the upstanding portion 25 forms a throat for conformingly receiving a coengaging shaft means; the coengaging shaft means and the throat forming a portion of the central support; all as will become apparent from the descriptive matter later hereinafter.

It is particularly preferable that the upstanding portion 25 be prepared to receive the remainder of the organizer 11 in such a manner that it can be swiveled to allow pivotally moving any rods being held in place. The structure that allows the swiveling will also become more clearly apparent from the descriptive matter later hereinafter. Again, it is important to note that there must be adequate structural strength to hold the bank member 15.

The bank member 15 must be long enough to support a plurality of holders 19 for the fishing rods or the like. As illustrated, it is long enough to support four such holders. The length can be varied as desired. For example, it has been found that respective ends cantilevered exteriorly of the respective holders may be from about 1 to about 3 inches, for example, about 1¾ inches whereas the distance separating the respective holders may be in the range of 4 to 7 inches, or as desired. The given dimensions allow use of a compact unit.

The blank member 15 may comprise a single wide unit or, as illustrated, it may comprise a cross-member 31 and a forwardly extending member 33 that is affixed thereto. For example, although a single wide cross-member could be employed, metal can be conserved by the use of the less wide cross-member 31. It can be affixed, as by way of welding, being bolted, or the like so as to be effectively rigid with the forward member 33. Of course, the forwardly extending member 33 must have adequate structural strength to support the cross-member 31 and the respective holders thereon when it is connected with the central support 17.

Figure 3:
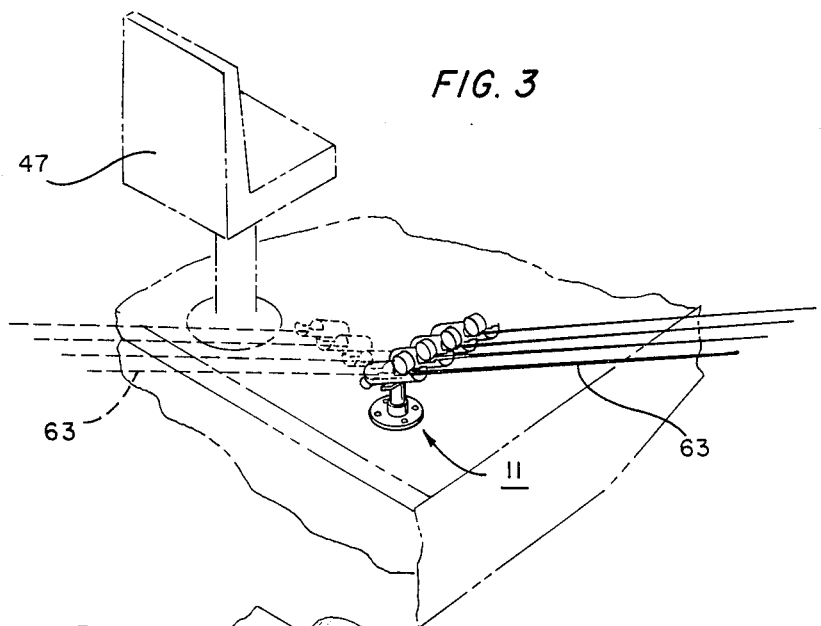
FIG. 3 is a perspective view of the embodiment of FIG. 2 with fishing rods organized and held in place.

The central support 17 may comprise any sort of simple, central support; or it may comprise more elaborate structures that can be pivoted, or rotated, endlessly. For example, the central support may comprise a simple ½ inch pipe about 3⅜ inch long that can be threaded into a threaded throat on the base 13. On the other hand, it is preferable that the central support include a shaft 35 that is adapted to conformingly engage the interior of the throat 25, or the upstanding portion 25, of the base. It it also preferable that the shaft 35 have a groove 37 extending peripherally therearound such that it can be rotated endlessly without screwing more deeply into the throat or coming unscrewed from the throat, as would be the case if a simple threaded pipe were employed and screwed into a collar or the like on the base 13. In the illustrated embodiment, a slot 39 is formed in the upstanding portion 25 on each side thereof and adapted to receive a C-clamp 41 that can be snapped into place or snapped therefrom for removing the entire organizer and any rods and accessories contained therein. Preferably the C-clamp is fastened to the base, as by a small chain or other lineal member 43, attached to suitable bracket or screw 45 such as holds base to deck. The central support may extend upwardly as far as desired above the base. It has been found that a relatively short central support works very well, since it can be emplaced in the base adjacent the chair of the fisherman, as shown in FIG. 3, the chair being shown by the number 47. For example, a typical height might comprise a central support of from 3 to 6 or 8 inches or more. It is desirable that the shaft extends far enough into the throat to provide adequate support and prevent too great a lateral motion. This ensures that the rods and reels and accessories are maintained in their place even during transport.

As illustrated in FIG. 2, at each end of the cross-member 31 there are provided apertures 49 for affixing an elastic member, such as a Bungee cord or other stretch cord, to lock in place the rods, reels and the like during transport or for movement of the boat in rough water, foul weather or the like. Expressed otherwise, the elastic cord may have a hook at each end hooked into these apertures and stretched over the rods to hold them firmly in place with their trigger members 51 extending through the respective apertures 53 of the holders 19, FIG. 1.

The respective holders 19 for the fishing rods and accessories are connected with the bank member at an appropriate location, for example, at the end or intermediate positions. The connection is preferably rigid, as by welding, bonding or the like. The connection may be by bolts, screws, or the like if constructed to prevent interference with the rods. Each of the holders has a tubular member 55 that is adapted to receive a handle of a fishing rod and to hold it releasably in place; primarily, through the insertion of the trigger member 51 through the aperture 53. The aperture 53 may range from about ⅜ inch to as much as ⅞ inch or more. For example, it has been found that ⅝ inch is adequate for this aperture. Each of the holders has an extended arched extension 57 of the tubular member for supporting the reel and the cantilevered portion of the rod, line and the like. As illustrated, the extension 57 is an integral part of the tubular member formed by suitable machining or the like. A recess 59 is provided at the base end to prevent interference with the handle of the rod and facilitate removal thereof. The recess 59 facilitates removal of the rods when the fisherman is ready to employ the same by simply elevating the free end of the rod to remove the trigger element 51 from its respective aperture 53. The recess 59 may be cut as much as ½ inch up into the tubular member 55 to facilitate removal of a rod handle. Each of the extensions 57 has a circumferentially extended heads 61 to hold the rods and reels in upright positions.

The holders 19 may be formed of any structurally strong material. Preferably, they are formed of metallic pipe or the like, although some forms of plastic would also be adequate.

Each overall holder may run in the range of from 4 to 8 inches in length with the outwardly extending portion being in the range of from 2 to 3 inches. The closed cylindrical portion must not be so long as to inhibit easy removal of the rod and reel. Yet, it is desirable that it be long enough to hold in place the rod and reel against mild pitching of the boat on which it is emplaced.

Figure 4:
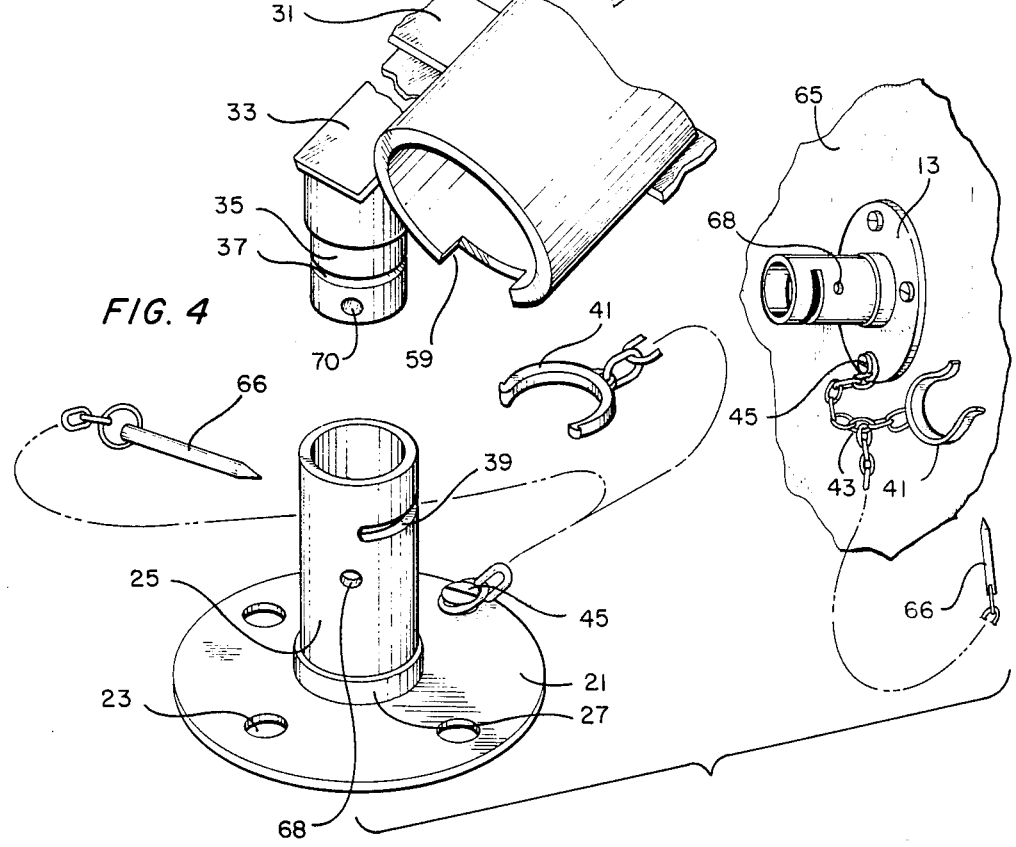
FIG. 4 is a schematic illustration of the interconnection between the central support of the bank member

In operation, the respective elements are formed and assembled as described hereinbefore. Thereafter, the base is affixed to the deck of a boat or the like and the coengaging shaft and throat forming a part of the central support are coengaged to support the rods and reels. The pre-assembled rods have their handles and trigger members inserted in the respective holders. As can be seen in FIG. 3, the organizer 11 with its respective rods and reels 63 may be pivoted from the solid line position to that shown in the dashed lines or as desired; because of the construction of the pivotal unit. Preferably, a second base is employed, as on the wall of a storage area, given the numeral 65 in FIG. 4, so that the extra base 13 serves as a receptacle for storing the preassembled remainder of the organizer and fishing rods. In this way, the remainder of the organizer 11 can be simply removed from the boat and stored on the garage wall or the like. The extra base 13 on the garage wall has the C-clamp 41 and the lineal member 43, similarly as delineated with respect to the primary illustration in FIG. 4. Respective locking pins 66 fit into lock apertures 68, 70 to hold a given position.

When this bass fishing organizer is mounted on a casting deck, it holds the rods near the fisherman and allows great attention and concentration on the fishing itself. This prevents breakage of rod tips, prevents loosing rods overboard while underway and prevents the rods from being kicked over the side of the boat during fishing. The bass fishing organizer 11 is conveniently mounted beside the casting chair for easy access and can be pivoted or rotated to keep the rods out of the way while keeping the rods within the easy reach of the fisherman. The bass organizer 11 prevents tangles between rods and their lines and holds the rod at such an angle that they are easy to get at and easy to allow casting yet completely out of the way of the fisherman.

From the foregoing, it can be seen that this invention achieves all of the advantages delineated hereinbefore.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. A bass fishing organizer for holding a plurality of pre-arranged in the sense of pre-organized and pre-fitted fishing rods and respective associated accessories, comprising:
   a. at least one mounting base for being affixed to a surface and adapted for supporting the plurality of fishing rods and accessories;
   b. a bank member having sufficient length and strength to hold in place the plurality of fishing rods and accessories and holders therefor; said bank member having a central support adjacent its center;
   c. said central support and said mounting base having coengaging means for supporting said fishing rods and accessories, said coengaging means including at least one respective throat and shaft that will matingly engage and having respective slots and a groove in the respective throat and shaft; said groove extending through 360° around said at least one shaft such that the bass organizer is rotatable for convenience; there is provided a retainer means that is removable and said removable retainer means includes a retainer C-clamp for snapping in place into said slot and engaging said groove to hold said central support rotatably coengaging said mounting base by way of said throat and coengaging shaft;
   d. respective holders for said fishing rods and accessories; said holders comprising one each for each fishing rod and accessory; said holders being connected to said bank member; each said holder having a tubular member adapted to receive a respective handle of a respective said fishing rod to hold it releasably in place and having a top to prevent slipping downwardly of its respective handle of said fishing rod and having a bottom aperture for receiving a trigger member on its said handle to prevent rotation of said fishing rod with respect to said holder.

2. The bass fishing organizer of claim 1 wherein two said mounting bases are provided, including one for a storage surface and one for a boat deck; said coengaging means includes respective throat and coengaging shaft means on each said mounting base and on said central support of said bank member and includes respective retainer recesses and removeable retainer means for fastening in place said central support, bank member and contained, organized fishing rods and accessories; either for fishing or storage.

3. A bass fishing organizer for holding a plurality of pre-arranged fishing rods and respective associated accessories, comprising:
   a. at least one mounting base for being affixed to a surface and adapted for supporting the plurality of fishing rods and accessories; said mounting base having a throat and slots and a C-clamp fastened thereto by a lineal member that is flexible so as to enable inserting said a C-clamp in said slots;

b. a bank member having sufficient length and strength to hold in place the plurality of fishing rods and accessories and holders therefor; said bank member having a central support adjacent its center;

c. said central support having a shaft and said shaft having a groove that is adapted to mating with said slots for receiving the a C-clamp for being releaseably received by the mounting base throat and retained in place by said C-clamp; said groove allowing pivotal motion of said bank member with respect to said mounting base; and d. respective holders for said fishing rods and accessories; said holders comprising one each for each fishing rod and accessory; said holders being connected with said bank member; each said holder having a tubular member adapted to receive a respective handle of the respective said fishing rod and to hold it releaseably in place.

4. The bass fishing organizer of claim 3 wherein said mounting base has its bottom lying in a plane referred to as the plane of said base; said central support is connected with said mounting base throat at substantially 90° with respect to the plane of said base; said bank member has width and has the receiving ends of its said holders adjacent its outside edge and its said central support adjacent its center; has its lateral axis inclined at an angle greater than 90° with respect to said central support so as to support said fishing rods at an angle inclined upwardly with respect to the horizontal.

5. The bass fishing organizer of claim 3 wherein each said holder has an arched extension of said tubular member, said arched extension being connected with said tubular member at one end and having an aperture in its bottom for receiving a finger trigger of its respective said fishing rod handle and the tubular member having a circumferentially extended head at its other end.

6. The bass fishing organizer of claim 3 wherein said mounting base has a round flange adapted to be affixed to the deck of a boat and similar planar surface and said throat receiving said shaft of the central support of said bank member; said bank member central support shaft sliding into engagement with said throat.

7. A bass fishing organizer for holding a plurality of pre-arranged fishing rods and respective associated accessories, comprising:

a. at least one mounting base for being affixed to a surface and adapted for supporting the plurality of fishing rods and accessories; wherein said mounting base has a round flange having apertures adapted to be affixed to the deck of a boat and similar planer surface and has a throat for receiving a shaft of a central support of a bank member;

b. said bank member having strength to hold in place the plurality of fishing rods and accessories therefor; said bank member having a central support adjacent its center and having a coengaging shaft for sliding into engagement with said throat; said shaft is pivotally retained within said throat, there is provided a retainer recess in said shaft and a retainer means for retaining coengagement of said shaft and said throat, said retainer recess includes a groove in said shaft matingly emplaced adjacent the slots in the wall of said throat and a C-clamp is removeably inserted through said slots and engaging said groove.

* * * * *